United States Patent
Bosseaux

(10) Patent No.: US 6,238,193 B1
(45) Date of Patent: May 29, 2001

(54) MOLD FOR TIRE AND VULCANIZING PRESS FITTED TO RECEIVE MOLD

(75) Inventor: Bernard Bosseaux, Chatel-Guyon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/354,521

(22) Filed: Jul. 15, 1999

Related U.S. Application Data

(60) Provisional application No. 60/096,781, filed on Aug. 17, 1998.

(30) Foreign Application Priority Data

Jul. 23, 1998 (FR) .................................................... 98 09593

(51) Int. Cl.[7] .................................................... B29C 35/02
(52) U.S. Cl. ................................. 425/36; 425/43; 425/46; 425/48; 425/54; 425/58
(58) Field of Search ................................. 425/36, 58, 48, 425/46, 54, 43; 264/326

(56) References Cited

U.S. PATENT DOCUMENTS

| | | | |
|---|---|---|---|
| 3,184,794 | * | 5/1965 | Sherkin ..................................... 18/18 |
| 3,690,795 | * | 9/1972 | Yoshida et al. ......................... 425/29 |
| 3,854,853 | * | 12/1974 | Mirtain .................................... 425/47 |
| 4,124,679 | * | 11/1978 | DeWitt ................................... 264/326 |
| 4,236,883 | * | 12/1980 | Turk et al. .............................. 425/32 |
| 4,758,401 | * | 7/1988 | Rach et al. ............................ 264/326 |
| 5,127,811 | | 7/1992 | Trethowan .............................. 425/32 |
| 5,129,802 | | 7/1992 | Sergel .................................... 425/36 |
| 5,589,200 | * | 12/1996 | Irie ........................................ 425/46 |
| 5,676,980 | * | 10/1997 | Gulka et al. ........................... 425/40 |

FOREIGN PATENT DOCUMENTS 1099156    2/1961    (DE) .

* cited by examiner

*Primary Examiner*—Harold Pyon
*Assistant Examiner*—Joseph S. Del Sole
(74) *Attorney, Agent, or Firm*—Baker Botts L.L.P.

(57) ABSTRACT

A mold for molding a tire having beads of different diameters, $\phi_0$ being the minimum diameter of the tire area at the bead of smaller diameter, $\phi_2$ being the minimum diameter of the tire area at the bead of greater diameter. The mold has two shells for molding, respectively, the outer surface of the sidewalls and the outer portion of each bead up to a radially inner limit where the diameter of the tire area is $\phi_0$ and $\phi_2$, respectively, a continuous counter-molding ring to mold the bead of smaller diameter from the said radially inner limit where the diameter of the tire area is $\phi_0$ to an axially inner limit of diameter $\phi_1$, where $\phi_1$ is smaller than $\phi_2$, and a split counter-molding ring to mold the bead of greater diameter from the said radially inner limit where the diameter of the tire area is $\phi_2$ to an axially inner limit of diameter $\phi_3$. The split ring includes a plurality of retractable segments adjacent in molding position. A flexible membrane molds the inner surface of the tire in the portion of the inner cavity of the tire between the limit of diameter $\phi_1$ and the limit of diameter $\phi_3$.

11 Claims, 8 Drawing Sheets

MOLD FOR TIRE AND VULCANIZING PRESS FITTED TO RECEIVE MOLD

This application is entitled to the benefit of provisional application Ser. No. 60/096,781, filed Aug. 17, 1998.

BACKGROUND OF THE INVENTION

This invention relates to the molding of tires. In particular, it pertains to the molding of a tire comprising two beads of special shape, requiring an undercut molding of a portion in the axially and radially inner zone of the bead. Reference is made here to a zone undercut in relation to the relative motion between the tire and the molding parts normally used to mold the axially outer surface of the side and bead of a tire.

In the prior art, means are known for accomplishing the undercut molding of a portion on a tire bead. For example, U.S. Pat. No. 5,129,802 proposes using two counter-molding rings for the axially and radially inner portion of the bead, said rings being continuous. In such a case, the counter-molding rings must be introduced into the interior of the tire. For this, it is necessary to deform the raw blank of a tire by ovalizing at least one of the beads, so that the said bead can be made to pass beyond the counter-molding ring. Rings for molding the radially and axially inner portion of a bead have also been described in connection with so-called membrane-less vulcanizing presses. See, for example, U.S. Pat. No. 4,236,883, which discloses such rings, in this instance made in several segments circumferentially adjacent in molding position. The patent cited above describes a mechanism occupying integrally the inner volume of the press, so that the necessary movements can be imparted to the several ring segments in order for said segments to accommodate a closing or opening movement in sequence. By a "movement in sequence" is meant that, from a configuration in which the mold is open, the segments do not all go to their molding position at the same time. A first group is brought to its final molding position, then the segments of a second group are inserted between segments of the first group to make a continuous ring.

SUMMARY OF THE INVENTION

The object of the present invention is to propose a means serving to mold undercut zones, in the sense of this expression as given above, on the beads of a tire, without unduly increasing the cost of a mold per tire.

The invention arises from the realization that if the diameters of the tire beads are sufficiently different, it is possible to use a continuous counter-molding ring on one side, in other words, a one-piece ring. The beads of larger diameter can pass over the counter-molding ring of the bead of smaller diameter without need for any deformation. This is favorable to the quality of molding and to the economy of the process. It is indeed difficult, and impairs tire quality, to induce deformations in the raw tire casing. The invention avoids, or at least reduces dramatically, the need for any ovalizing deformation at the stage of the raw blank. For at this stage, the raw rubber does not as yet have significant mechanical strength to readily withstand the phases of ovalizing deformation and manipulations to cross a continuous rigid ring whose outside diameter is greater than the inside diameter of the beads to be vulcanized.

For the other bead, use may be made of a counter-molding ring split into several segments. The invention also proposes combining the use of counter-molding rings, of which one is continuous and the other split, with the use of a flexible membrane to mold the portion of the inner tire cavity between the counter-molding rings. The asymmetry of the mold so proposed renders it easier to accommodate, inside the press, the mechanism required to control the counter-molding ring split into several segments and the mechanism required to move the vulcanizing membrane.

The mold, according to the invention, for a tire having a tread, two sides, and two nonsymmetrical beads, $\Phi_0$ being the least diameter of the tire area at the bead of smaller diameter, $\Phi_2$ being the least diameter of the tire area at the bead of greater diameter, comprises:

two shells for molding, respectively, the outer surface of each side and the outer portion of each bead up to a radially inner limit where the diameter of the tire area is $\Phi_0$ and $\Phi_2$, respectively;

a continuous counter-molding ring to mold the bead of smaller diameter from the said radially inner limit where the diameter of the tire area is $\Phi_0$ to an axially inner limit of diameter $\Phi_1$, where $\Phi_1$ is smaller than $\Phi_2$ and where $\Phi_1$ is greater than $\Phi_0$.

Preferably, the mold further comprises a split counter-molding ring to mold the bead of greater diameter from said radially inner limit where the diameter of the tire area is $\Phi_2$ to an axially inner limit of diameter $\Phi_3$, said split ring comprising a plurality of retractable segments, adjacent in molding position.

Advantageously, the mold according to the invention comprises a flexible membrane to mold the inner surface of the tire in the portion of the inner cavity of the tire between the limit of diameter $\Phi_1$ and the limit of diameter $\Phi_3$. Of course, for the portion molding the outer surface of the tire beyond the beads, any suitable type of mold may be used. For example, shells can be used for molding of the sidewalls alone, whereas use is made of a set of radially movable sectors to mold the tread. Those skilled in the art are acquainted with sector molds. It is likewise possible to use a two-part mold. In this type of mold, each half of the tread is molded by a molding portion integral with one of the shells. It is likewise possible to use a two-part mold in which the portion molding the tread is itself made up of sectors.

In fact, the invention proposes means for molding the inner surface of the tire as far as the beads, including at least partially the radially inner portion of the beads. This is especially serviceable when the said surface has a special shape, in particular undercut in relation to a reference direction parallel to the axis. The molding of the outer surface of the tire is not a concern of the present invention. It is believed that any suitable type of mold can be used.

The invention likewise proposes a tire vulcanizing press comprising a mechanism serving to impart to a counter-molding ring in several parts all the motions required, without adding any controls besides those normally available on a vulcanizing press. The invention proposes a press of membrane type, so arranged and adapted that the motion of the lower membrane plate relative to the lower frame suffices also to drive the motion of all the segments of the counter-molding ring.

The press according to the invention receives a tire mold having a centerline corresponding to the axis of rotation of said tire, said mold comprising:

two shells to mold the outer surface of a sidewall and to mold the outer portion of one of the beads up to a radially inner limit where the diameter of the tire area is a minimum;

at least one split counter-molding ring to mold the surface of a bead beyond the said limit and on the axially inner side, said split counter-molding ring being made up of first segments and second segments, said first and second segments being adjacent in molding position;

a membrane molding the inside of the tire.

The press according to the invention further comprises:

a lower frame to receive one of the shells;

a movable frame to receive the other shell;

means of driving the relative approach and withdrawal of said lower frame and movable frame toward and away from each other;

a lower membrane plate;

means for imparting relative motion between the lower membrane plate and the lower frame;

first means to receive first segments and second means to receive second segments, the set of first and second segments constituting the said split counter-molding ring;

a mechanism to move the first and second segments, said moving mechanism being actuated by the relative motion of the lower plate with respect to the lower frame, and effecting the movement in successive sequences of the first segments in a first sequence, and of the second segments in a second sequence, so as to bring said segments of the counter-molding ring into molding position and retract them.

The description to follow illustrates a preferred embodiment of the invention.

DESCRIPTION OF PREFERRED EMBODIMENTS

Figure 1:
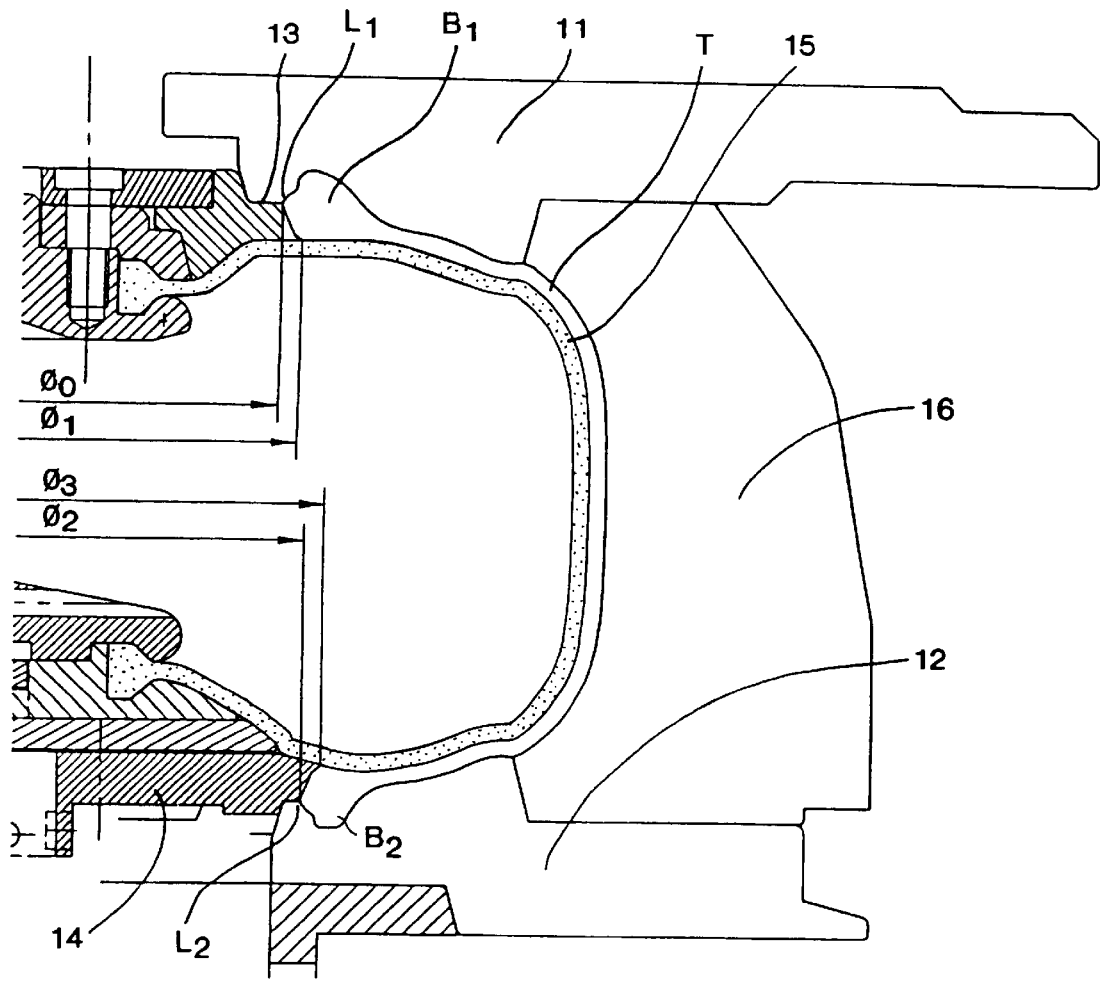
FIG. 1 is a sectional view of a tire mold according to the invention.

In FIG. 1 a tire T is shown in vertical suspension (see patent EP 0 673 324). The tire T comprises two beads B1 and B2, respectively. The shape of these beads is characterized by the radially inner limits L1 and L2, respectively. These limits correspond to the point where the diameter is least. Thus, for the bead B1, the diameter at the limit L1 is $\Phi_0$. For the bead B2, the diameter at the limit L2 is $\Phi_2$. The outer surface of the sidewalls of a tire, including the beads, is generally molded by a part called a shell. A shell starts from the position of least diameter, conventionally the tip of the bead, and extends about to the shoulders of the tire. In fact, sometimes elements independent of the shells are used to mold the outer face of a bead, but in the context of the present invention, it is immaterial whether the part molding the outer surface of the bead is integrated with the shell or separate from it.

The molding and release of a tire involve the relative motions in axial direction between the tire T and each of the shells 11 and 12 molding it. In FIG. 1, it is readily seen that the shape to be imparted to the outer surface of the beads and sidewalls is compatible with a relative motion in axial direction between each of the shells 11 and 12 and the tire T. The beads B1 and B2 must be given a special shape that could not be imposed with the desired accuracy by means of a vulcanizing membrane. Hence, the use of additional rigid molding parts, the counter-molding rings, is required. In the preferred embodiment shown in the drawings, one of these counter molding rings 13 is a continuous ring and the other 14 is a split ring. The fact that the ring for molding the bead of greater diameter is a split ring makes it possible to mold important undercuts. On the other hand, it is not impossible to mold the bead of greater diameter with a continuous nonsplit ring. The dissymmetric feature of the mold together with the use of a nonsplit ring for the bead whose diameter is the smallest is an advantage of this invention.

The counter-molding rings are thus intended to mold the portion of each of the beads B1 and B2 between the limits L1 and L2, respectively, and as far as where there is a shape compatible with molding by means of a flexible membrane deployable inside the inner cavity of the tire. On the side of the bead B1 of smaller diameter, the continuous counter-molding ring 13 does the molding between the limit L1 corresponding to the diameter $\Phi_0$ and the level of the inner surface of the tire, where the diameter has the value $\Phi_1$.

Figure 3:
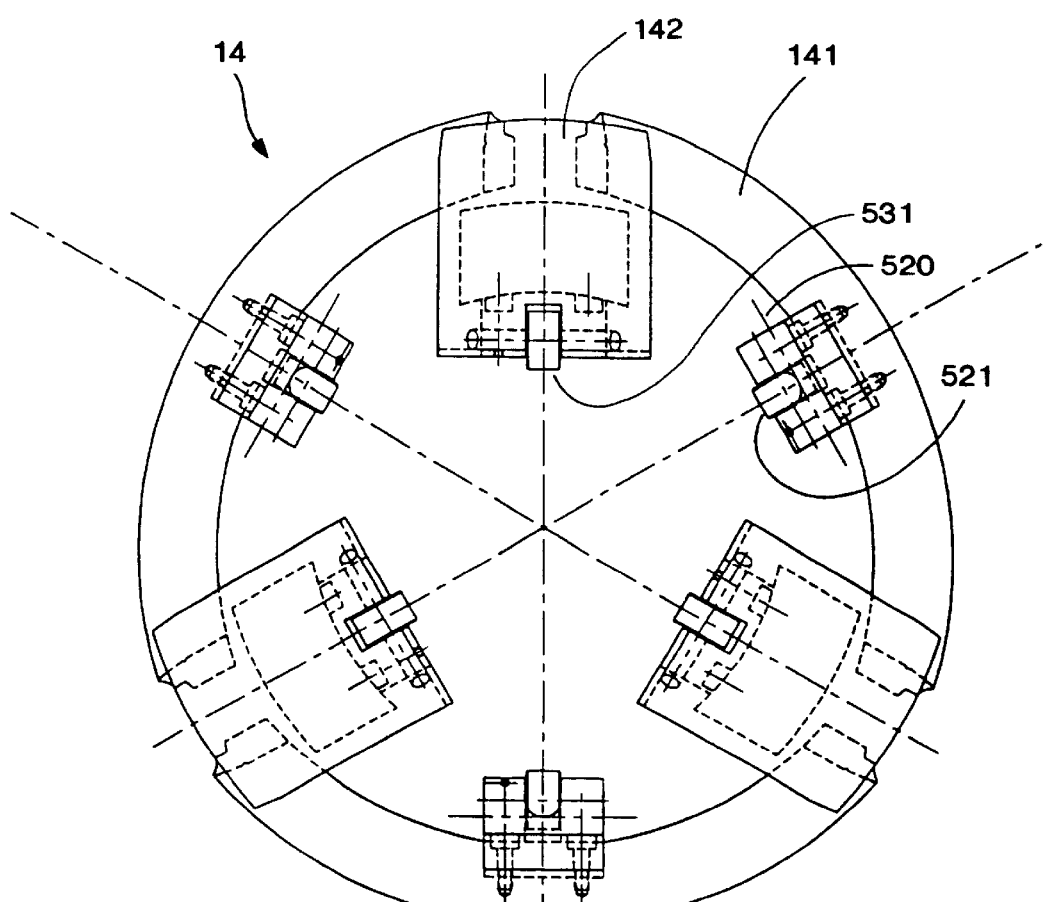
FIGS. 3 and 4 show the split counter-molding ring in a configuration when loading a raw casing.
Figure 4:
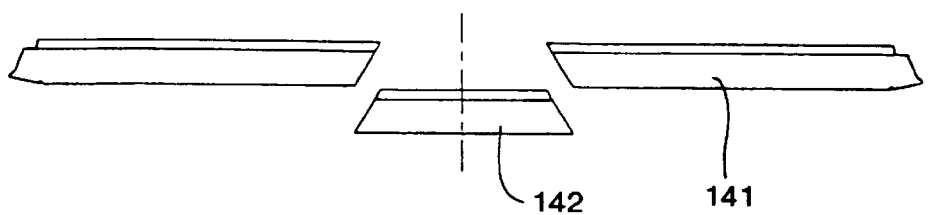
Figure 6:
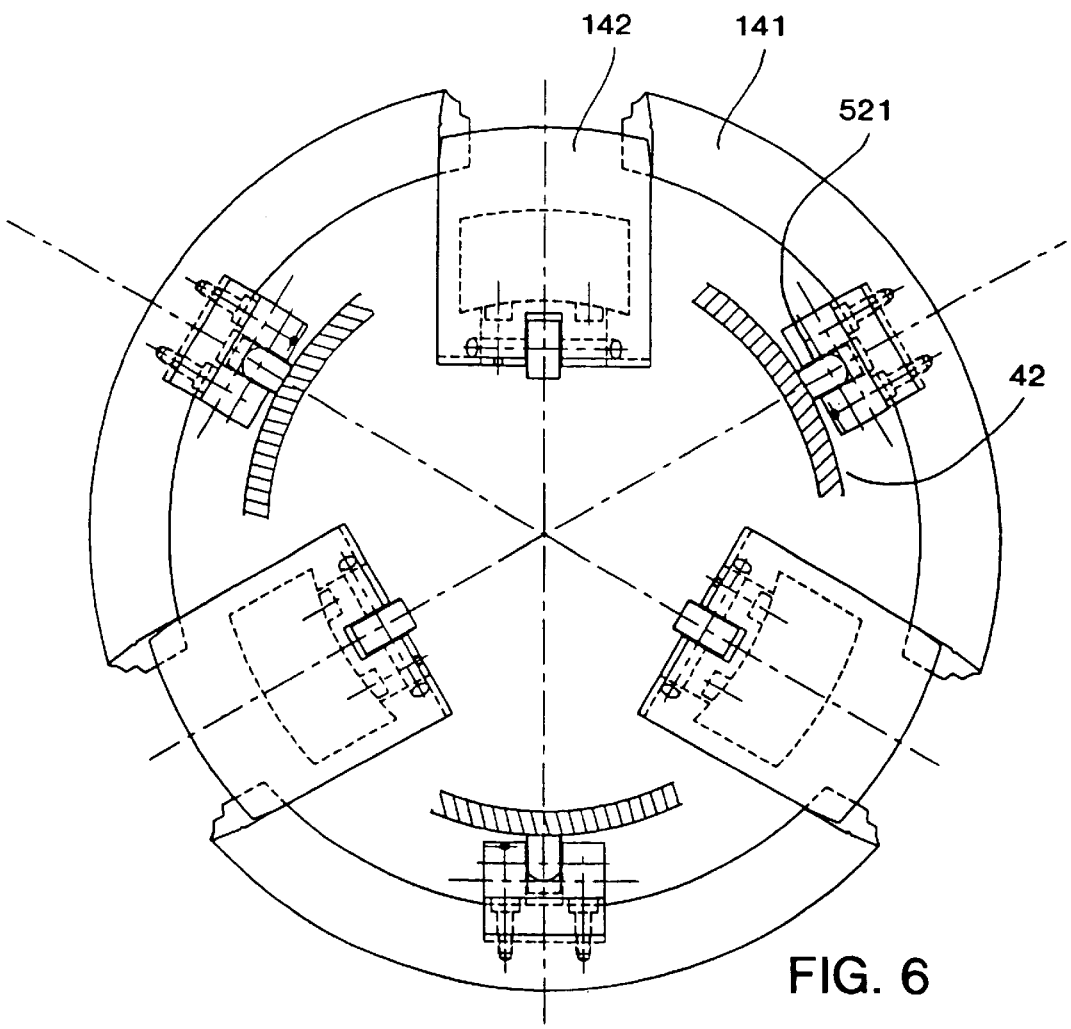
FIGS. 6 and 7 show the split counter-molding ring in a configuration corresponding to FIG. 5.
Figure 9:
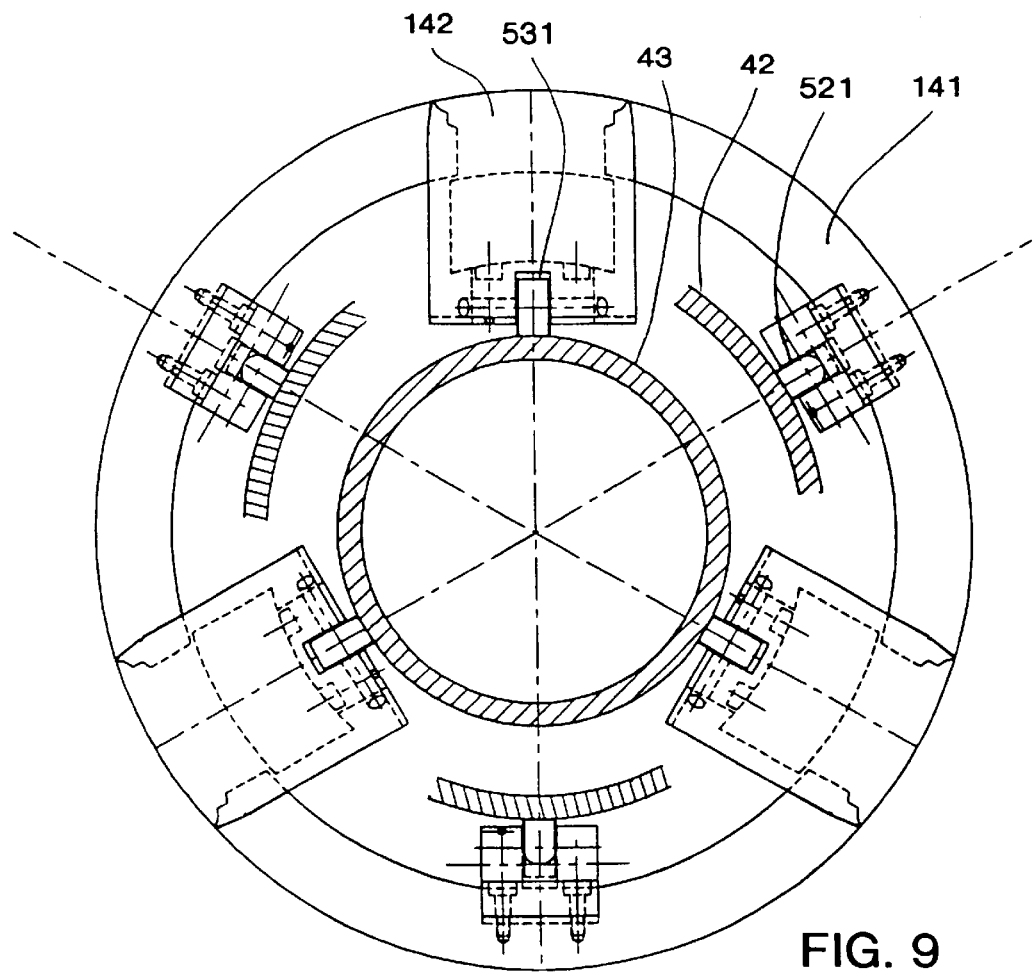
FIGS. 9 and 10 show the split counter-molding ring in a configuration corresponding to FIG. 8.
Figure 10:
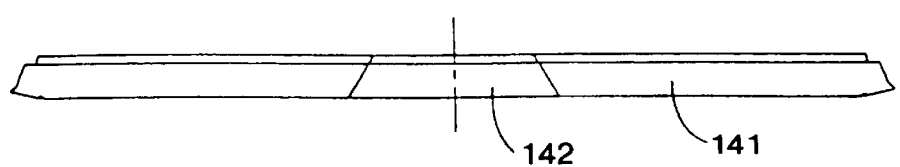
Figure 11:
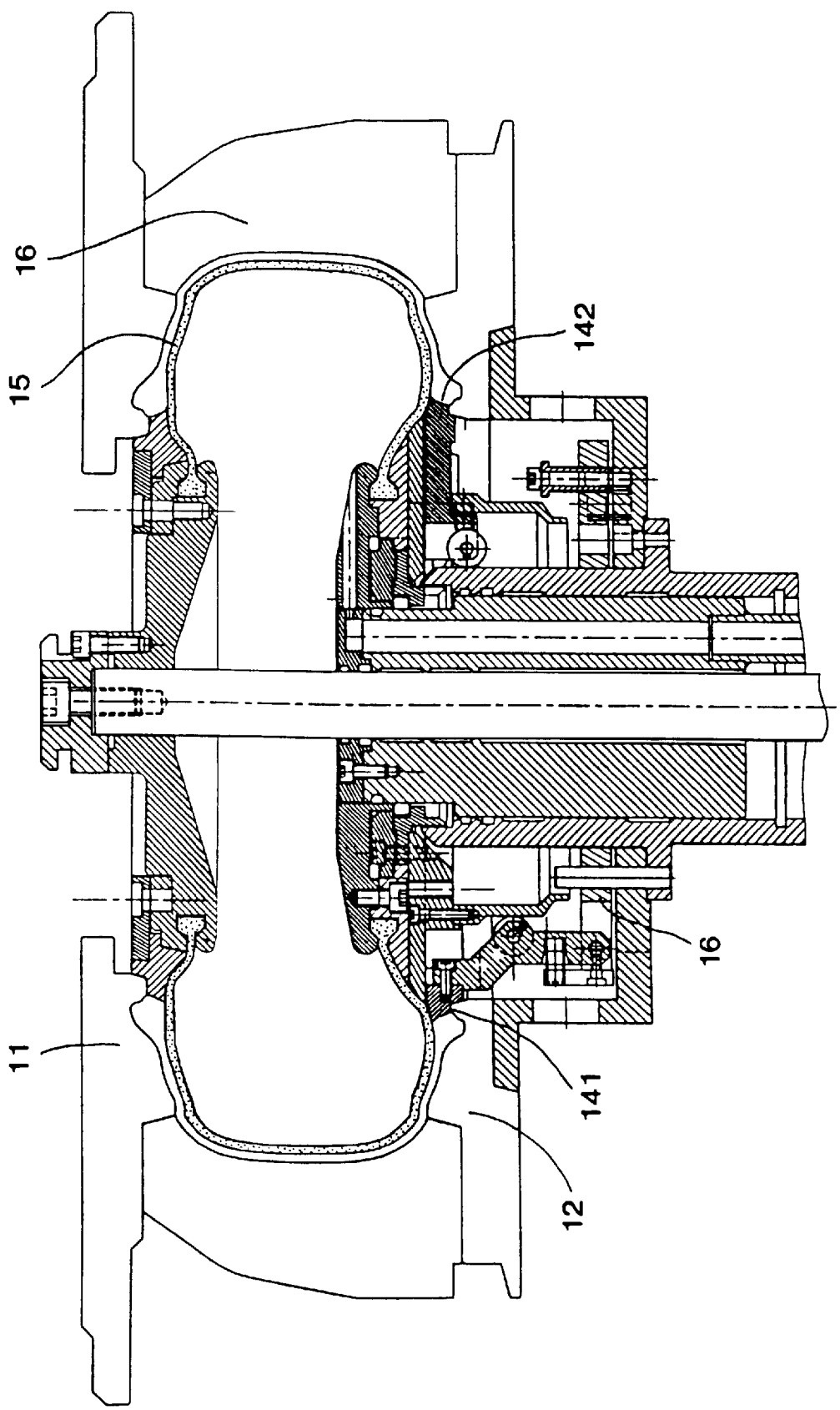
FIG. 11 shows the same press in molding position.

In the mold proposed by the present invention, the value of the diameter $\Phi_1$ is less than or equal to the diameter $\Phi_2$ corresponding to the limit L2 of the bead B2 of greater diameter. Hence, it is possible to pass the continuous counter-molding ring 13 inside the opposite bead B2. This continuous counter-molding ring 13 is made in one piece. On the other side, the split counter-molding ring 14 is made in several segments: a group of first segments 141 and a group of second segments 142. This enables the split counter-molding ring 14 to be retracted so that the tire can be placed in the vulcanizing press and be extracted after vulcanizing. More specifically, FIGS. 3, 6 and 9 show that the mold comprises a number N of first segments 141 (here N=3) and a like number N of second segments complementary to the said first segments. More specifically, in FIGS. 4, 7 and 10, we see that the circumferentially lateral faces of the first segments 141 converge towards the inside of the mold (these are regular sector-like segments) and that the lateral faces of the second segments 142 converge towards the outside of the mold (these are inverted segments). This enables the second segments 142 (the inverted segments) to enter between the first segments (the sector-like segments non inverted) and approach said first segments by an axial motion from the inside of the mold.

Finally, for the rest of the inner cavity of the tire, a vulcanizing membrane 15 is used, membrane vulcanizing being a long used and proven technique. We see also that use is made of a mold with sixteen sectors movable relative to the shells, to mold the outer surface of the tread.

Figure 2:
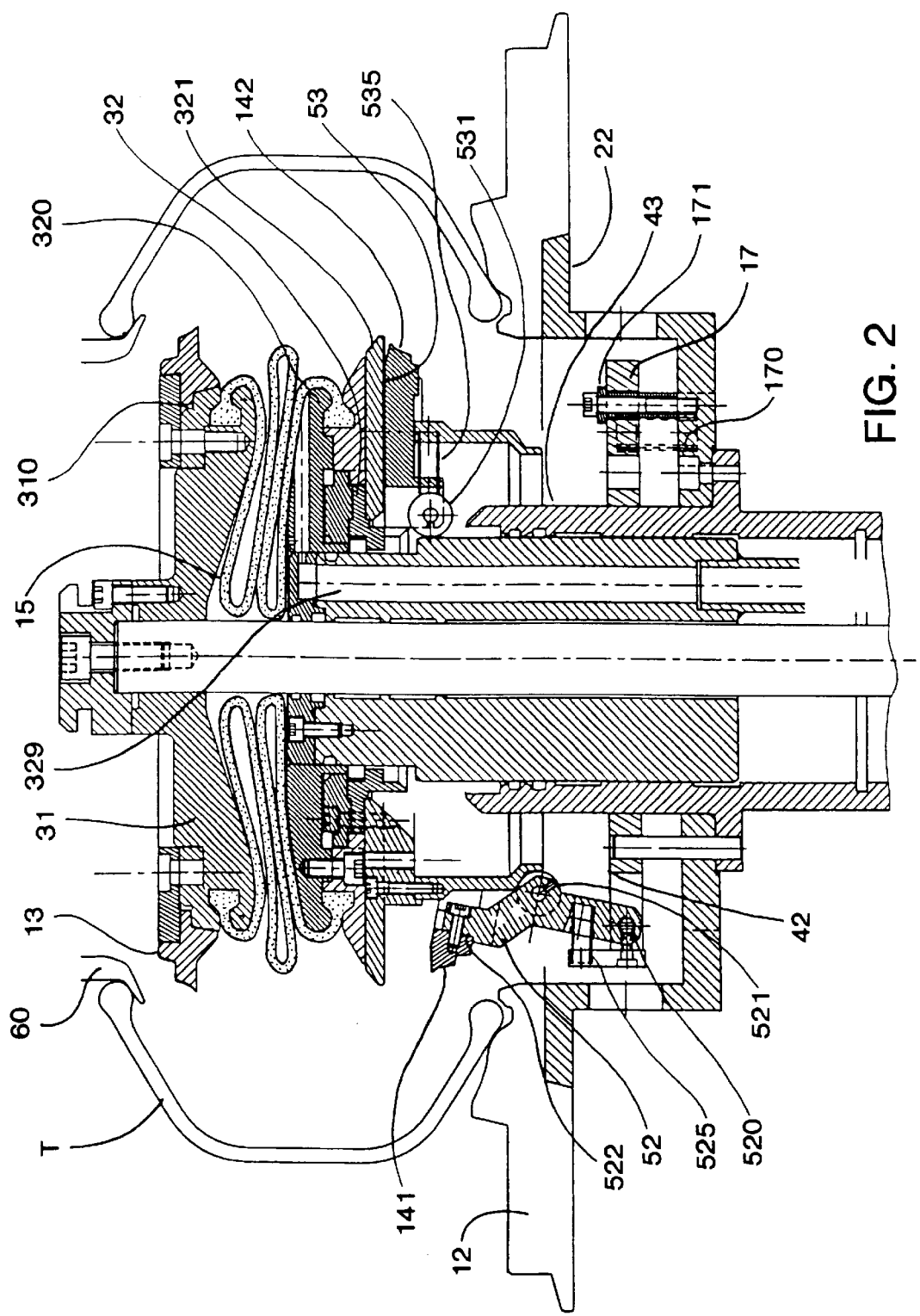
FIG. 2 is a sectional view of a vulcanizing press according to the invention, showing it in a configuration at the time of loading a raw casing.

FIG. 2 shows a press comprising a lower frame 22 on which is fixed the shell 12. The press also comprises a movable frame (not shown), also called the upper frame, to which is fixed the shell 11. Here, certain parts of the press are referred to by the adjectives 'lower' and 'upper' to correspond to the usual terminology, because the presses are generally built to receive a mold positioned with its axis vertical. Of course, the lower or upper description of the parts of the press is not limiting, and these terms are employed only to use conventional terminology.

The press described uses a symmetrical membrane 15, but the symmetry of the membrane is not restrictive. The membrane 15 is anchored on a lower membrane plate 32 and an upper membrane plate 31. The motions imparted to the lower membrane plate 32 and to the upper membrane plate 31 are well known. They permit or facilitate the deployment of the membrane, or its reployment at the time of unmolding, loading of a raw casing to be vulcanized, or unloading of a tire after vulcanizing. Generally, provision is made for a relative axial motion between the lower membrane plate and the upper membrane plate as well as a motion of said plates relative to the reference consisting of the lower frame 22 of the press. A loading fixture 60 is provided to place a raw casing on the shell 12.

The continuous counter-molding ring 13 is mounted directly on the upper membrane plate 31. For that purpose, said upper membrane plate 31 comprises a bearing part 310 to receive the said continuous counter-molding ring 13. The latter is thus necessarily given the same motions as the upper membrane plate 31. The continuous counter-molding ring 13 is readily removable, so that it can be adapted to the profile to be molded on the corresponding bead of the tire.

Also shown are first segments 141 and second segments 142 making up the whole of the split counter-molding ring 14. The second segments 142 are inserted between the first segments and after the first segments have reached their final position are, like a key of an arch-and-key construction, inserted between sections of the arch in the final phase of the construction of the arch, to complete the structure of the ring 14. The continuous counter-molding ring 13 does the molding of a portion of the bead of smaller diameter, that is to say the so-called upper bead, referring to its position in the press. The split counter-molding ring 14 molds a portion of the bead of large diameter, that is to say of the so-called lower bead, referring to its position in the press.

Each of the first segments 141 is mounted on a rocking arm 52, itself mounted rotatably at the point 520 on the slide 17. The slide 17 is mounted on the lower frame 22 of the press, and may be translated relative thereto over a short distance, the motion of translation being parallel to the axis. The function of this axial translation will appear below. Springs 170 tend to press the slide 17 against a stop 171, its rest position being against the stop 171, as in FIG. 2. A spring 525 (one for each of the rocking arms 52) urges each rocking arm 52 towards an open (or retracted) position as shown in FIG. 2. A roller 521 is rotatably mounted on each of the rocking arms 52. A first cam 42 is integral with the lower membrane plate 32. The profile of the radially outer surface of this first cam 42 serves to impart a controlled motion for the rocking of the arms 52. The first cam 42 has a ramp, or taper portion, followed by a cylindrical portion. The combination of the rocking arms 52, rollers 521, springs 525 and cam 42 makes up a first cam follower for controlling the actuation of the first segments 141. The first segments are retained on a bearing surface 522 on each of the rocking arms, permitting ready change of the first segments 141 according to the profile to be molded on the tire produced.

A counter-plate 320 immobilizes the membrane 15 on the lower membrane plate 32. The lower membrane plate 32 is mounted on a hollow rod provided with channels 329 to supply and return the vulcanizing fluid to and from the inside of the membrane 15. A guide plate 321 is mounted on the lower membrane plate 32. The second segments 142 are mounted on the guide plate 321 in grooves 53 formed between said guide plate 321 and the first cam 42. Said second segments 142 are thus guided in relation to the lower membrane plate 32. A spring 535 (one for each of the second segments 142) thrusts each second segment 142 towards an opening (or radially retracted or in any other suitable way retracted) position as shown in FIG. 3. A roller 531 is rotatably mounted on each of the second segments 142. The set of second segments is very readily interchangeable according to the profile to be molded on the tire produced. It suffices to mount a roller 531 on each second segment 142 and insert a spring 535 at installation of each second segment 142, thus constituting the means for receiving the second segments 142.

A second cam 43 is fixed on the lower frame 22 of the press. The profile of the radially outer surface of said second cam 43 serves to impart a controlled motion for the advance of each of the second segments 142. The second cam here comprises a ramp, or taper portion, followed by a cylindrical portion. The system of rollers 531 and springs 535 makes up a second cam follower, actuating the second segments 142.

The several phases of the molding operation are as follows.

Figure 5:
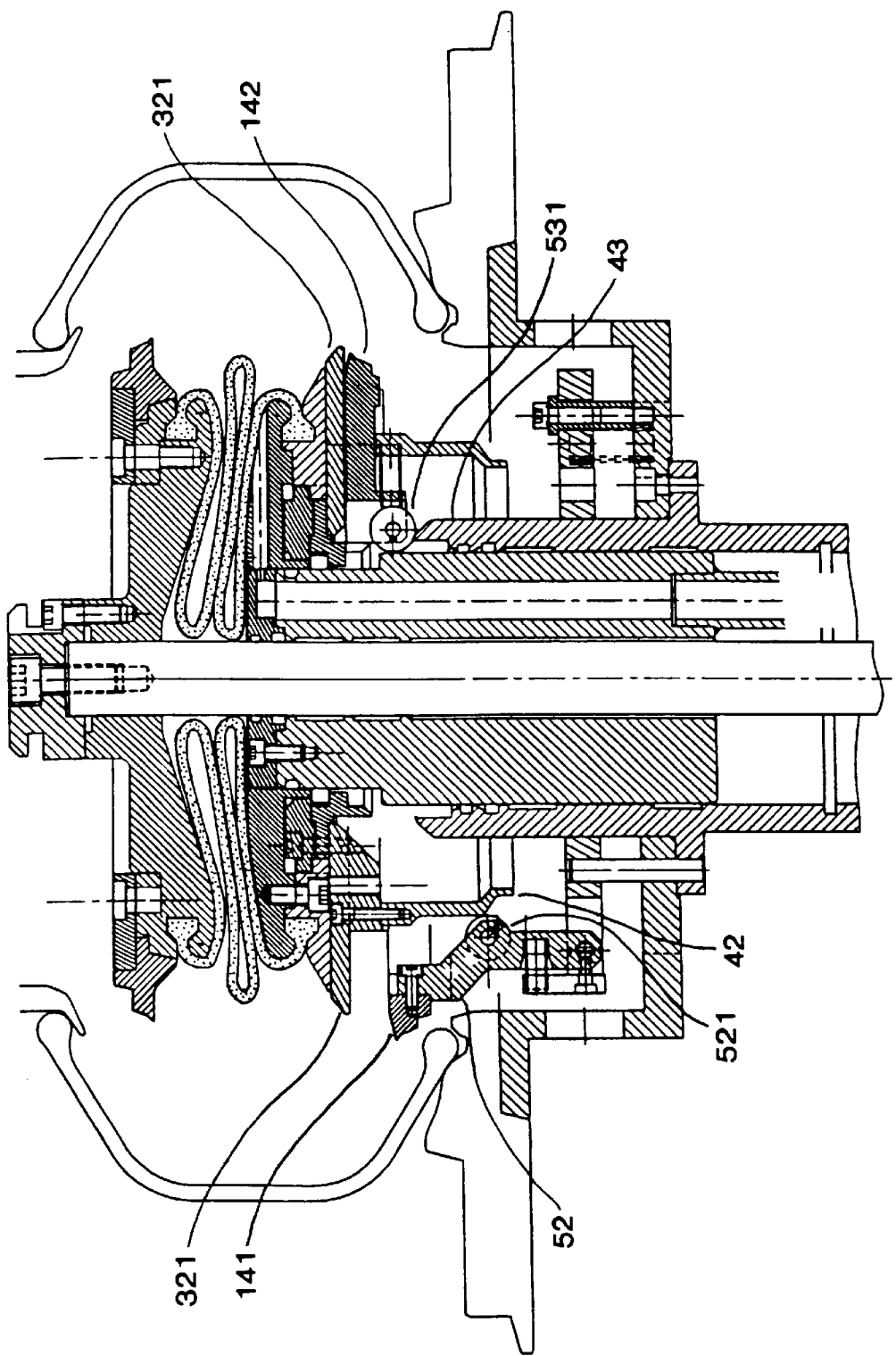
FIG. 5 shows the same press in a first phase of closing.

Once the raw casing has been placed on the shell 12, we begin by assembling the first and second segments 141 and 142. Given the position of the cams 42 and 43 relative to the rollers 521 and 531, a relative motion between the lower membrane plate 32 and the lower frame 22 of the press first brings the first cam 42 into contact with the rollers 521. The ramp of the cam causes the arms 52 to rock, and, hence, each of the first segments 141 to expand radially. This is the configuration seen in FIGS. 4, 5 and 6.

Each of the rollers 531 then goes into contact and cooperates with the second cam 43. Its ramp effects the radial deployment of each of the second segments 142. This is the configuration seen in FIGS. 7, 8 and 9. Note that since the second segments 142 are mounted on and guided in relation to the lower membrane plate 32, and because the set of motions is controlled by the displacement of said lower membrane plate 32 axially downward towards the lower frame 22, the motion of deployment, purely radial with respect to the lower membrane plate 32, is superimposed with an axial translation, that of the lower membrane plate 32. Thus, the first and second segments 141 and 142, which are shown axially staggered in FIG. 6, are aligned in FIG. 9. At this stage, the split counter-molding ring 14 is reassembled.

Figure 7:
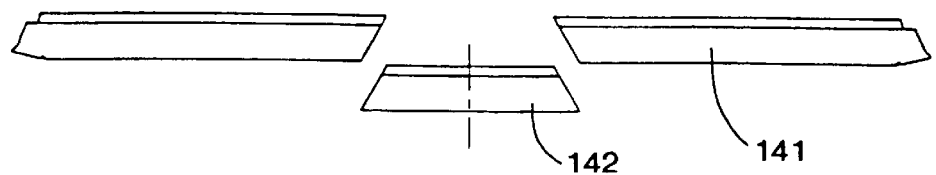
Figure 8:
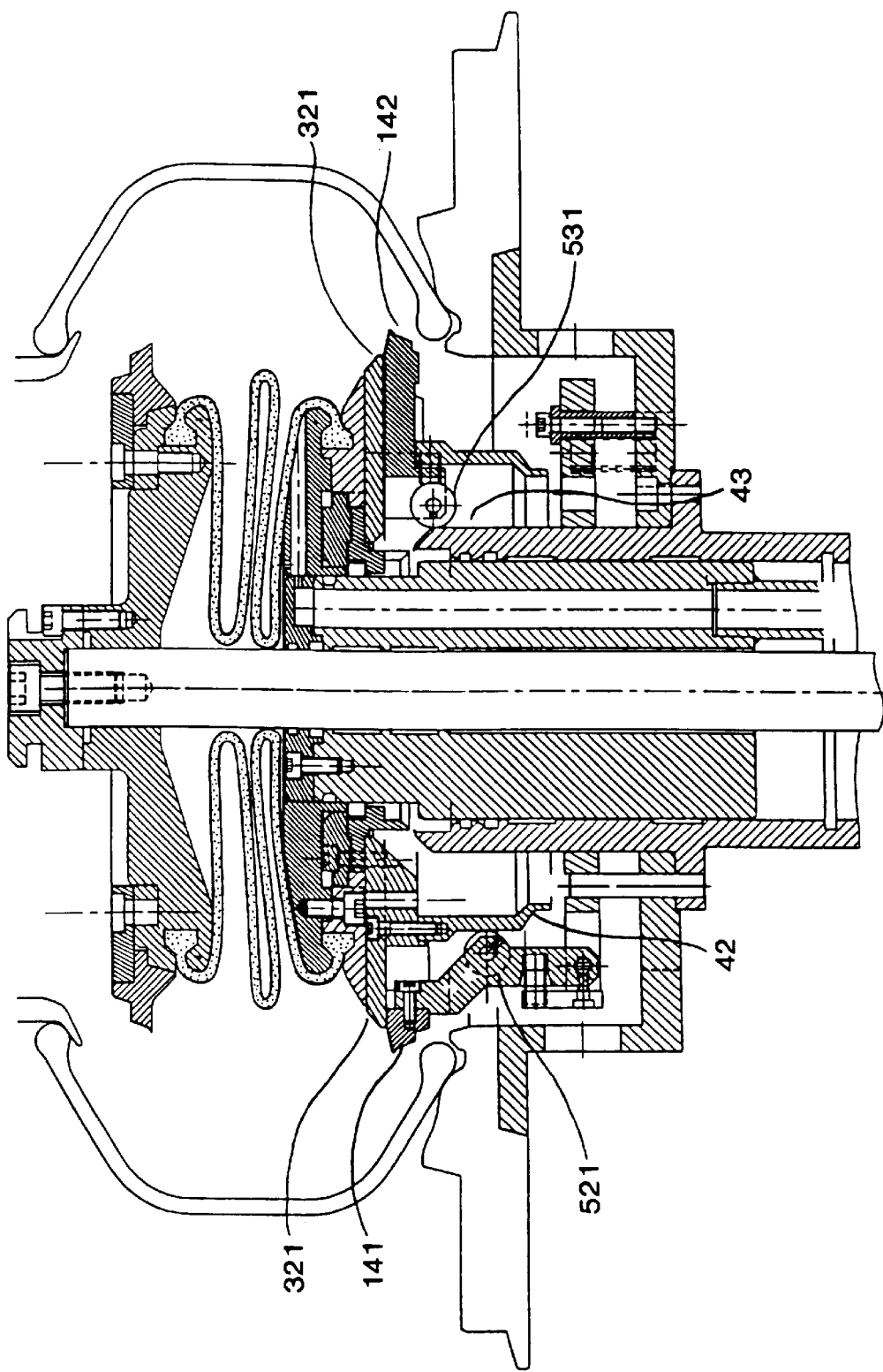
FIG. 8 shows the same press in a further phase of closing.

The motion in sequence is effected because the rollers 521 meet the first cam 42 before the rollers 531 meet the second cam 43. Here, the rollers 521 meet the first cam 42 simultaneously and the rollers 531 meet the second cam 43 simultaneously. In FIG. 7, we also note the significance of the axial staggering, in as much as the rollers 531 are at the boundary between the ramp and the cylindrical portion of the second cam 43, while the rollers 521 are already well beyond the boundary between the ramp and the cylindrical portion of the first cam 42.

In the configuration of FIG. 7, the guide plate 321 has just come into contact with the first segments 141. It will be recalled that the second segments 142 are mounted on the guide plate 321. Hence, the continued motion of actual approach of the lower membrane plate 32 and the lower frame 22 pushes the split counter-molding ring 14 back axially. This motion ceases when the split counter-molding ring 14 enters into contact with the shell 12. This final phase of axial motion does the molding of the bead B2.

As for the bead B1, a relative motion of axial approach between the shell 11 and the upper membrane plate 31 brings the continuous counter-molding ring 13 into contact with the shell 11. This axial motion molds the bead B1.

Of course, the molding of the beads B1 and B2 by the counter-molding rings 13 and 14, respectively, may be simultaneous. The deployment of the membrane 15 occurs preferably after the molding of the beads by the counter-moldings, as has just been explained. The press is then in the configuration of FIG. 10. The vulcanizing continues in the conventional manner.

At the end of vulcanizing, the membrane 15 is collapsed. The split counter-molding ring 14 is retracted by a relative deflection of the lower membrane plate 32 with respect to the lower frame 22 (causing the set of motions described above to be repeated in reverse order). Then, or simultaneously or previously, the continuous counter-molding ring 13 is shifted axially relative to the shell 11, allowing unloading tongs to be inserted under the bead B1.

The split counter-molding ring is placed in an alternative arrangement where the first segments are connected to the lower frame of the press while the second segments are connected to the lower membrane plate. The invention may be embodied with great compactness, accommodating an internal mechanism required to deploy the flexible vulcanizing membrane. This also permits all the desired motions without any drive other than that of the lower and upper membrane plates. If desired, of course, the movable frame of the press may be equipped with control means that permit molding by a counter-molding ring in several parts. The invention permits precision molding of the beads of tires having a bead of special shape. The invention serves to render the molding of complex shapes compatible with comparative simplicity of the mold and of the vulcanizing press. Specifically, the vulcanizing press requires no motion controls additional to those available in entirely conventional membrane vulcanizing presses.

I claim:

1. A mold for a tire comprising a tread, two sidewalls and two nonsymmetrical beads, the beads having radially inner surfaces oriented toward an inner cavity of the mold, the inner surface of one bead being a tire area defined between diameters $\Phi_0$ and $\Phi_1$ and the inner surface of the other bead being a tire area which includes a radially inner limit of diameter $\Phi_2$, $\Phi_0$ being the least diameter of the tire area at the bead of smaller diameter, $\Phi_2$ being the least diameter of the tire area at the bead of greater diameter, said mold comprising:

two shells for molding, respectively, an outer surface of each of the sidewalls and an outer portion of each of the beads up to a radially inner limit where the diameter of the tire area is $\Phi_0$ and $\Phi_2$, respectively;

a continuous counter-molding ring to mold the radially inner surface of the bead of smaller diameter which ring has a molding surface confined to the molding of the inner surface of the bead from said radially inner limit where the diameter of the tire area is $\Phi_0$ to an axially inner limit of diameter $\Phi_1$, where $\Phi_1$ is smaller than $\Phi_2$ and where $\Phi_1$ is greater than $\Phi_0$.

2. A mold according to claim 1, comprising sectors movable relative to the shells to mold the outer surface of the tread.

3. A mold according to claim 1, comprising a split counter-molding ring to mold the radially inner surface of the bead of greater diameter which bead surface extends from said radially inner limit where the diameter of the tire area is $\Phi_2$ to an axially inner limit of diameter $\Phi_3$, said split ring comprising a plurality of retractable segments which are in engaging relationship in molding position.

4. A mold according to claim 3, comprising a flexible membrane to mold the inner surface of the tire in the portion of the inner tire cavity between the limit of diameter $\Phi_1$ and the limit of diameter $\Phi_3$.

5. A mold according to claim 3, in which the plurality of retractable segments comprises a number N of first segments having circumferentially lateral faces which converge towards the inside of the mold and an identical number N of second segments having lateral faces which are complementary to the lateral faces of the first segments.

6. A tire vulcanizing press receiving a tire mold, having a centerline corresponding to the axis of rotation of said tire, said mold comprising:

two shells to mold an outer surface of a sidewall of the tire and an outer portion of a bead as far as a radially inner limit;

at least one split counter-molding ring to mold an inner surface of the bead extending beyond said radially inner limit to an axially inner side, said split counter-molding ring being made up of first segments and second segments, said first and second segments being in engaging relationship in molding position;

a membrane to mold the inside of the tire;

said press further comprising:

a lower frame to receive one of the shells;

a movable frame to receive the other shell;

control means for relative approach and withdrawal of said lower frame and movable frame;

a lower membrane plate;

means for controlling relative motion between the lower membrane plate and the lower frame;

first means for receiving the first segments and second means for receiving the second segments, the assembly of first and second segments forming the said split counter-molding ring;

a mechanism for displacing the first and second segments, said mechanism being actuated by relative motion of the lower plate with respect to the lower frame, and causing the motion in successive sequences of the first segments in a first sequence, and of the second segments in a second sequence, so as to bring said segments of the counter-molding ring into molding position and to retract them.

7. A press according to claim 6, in which the first segments are linked to the lower frame and the second segments are linked to the lower membrane plate.

8. A press according to claim 6, in which the first segments are mounted on a slide translatable with respect to the lower frame, a translatory motion of the slide with respect to the lower frame being parallel to the axis.

9. A press according to claim 6, comprising an upper membrane plate sliding relative to the lower membrane plate, said upper membrane plate comprising anchorage means for said vulcanizing membrane, said upper membrane plate comprising a bearing surface to receive a continuous counter-molding ring for the surface radially and axially within a bead.

10. A press according to claim 6, in which the displacing mechanism comprises:

a first cam integral with the lower membrane plate and first cam followers actuating the first segments;

a second cam integral with the lower frame and second cam followers actuating the second segments.

11. A press according to claim 10, in which the first cam followers are rocker arms, a roller being rotatably mounted on each of said arms articulated and cooperating with said first cam.

* * * * *